June 3, 1969  M. HUNGERFORD  3,447,399
TRANSMISSION ASSEMBLY FOR TRACTOR
Filed March 23, 1967  Sheet 1 of 7
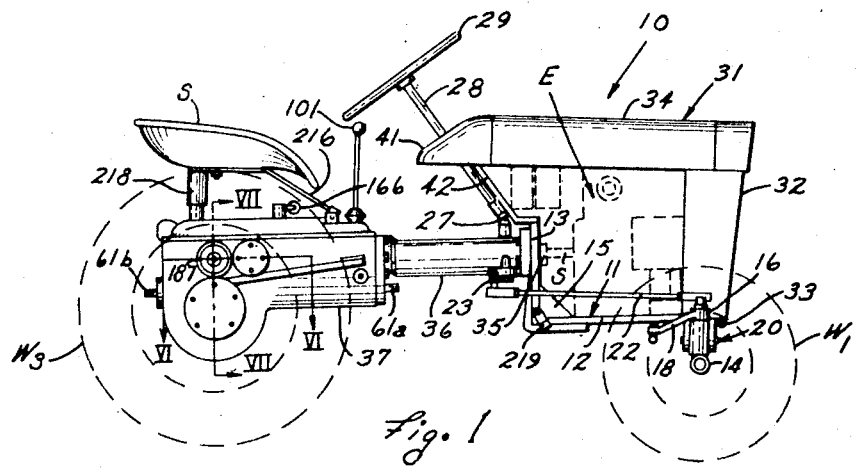
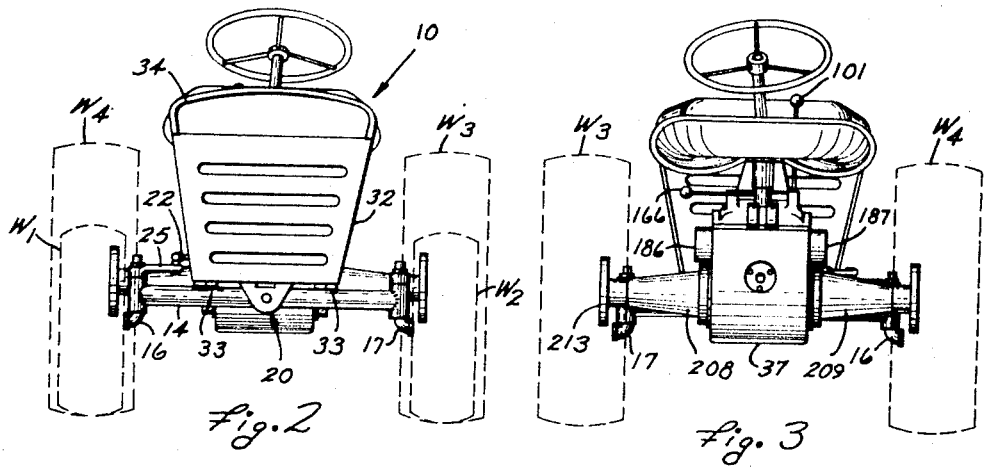
INVENTOR.
MAX HUNGERFORD
BY
ATTORNEY

INVENTOR.
MAX HUNGERFORD
BY
ATTORNEY

INVENTOR.
MAX HUNGERFORD

INVENTOR.
MAX HUNGERFORD

INVENTOR.
MAX HUNGERFORD
BY
ATTORNEY

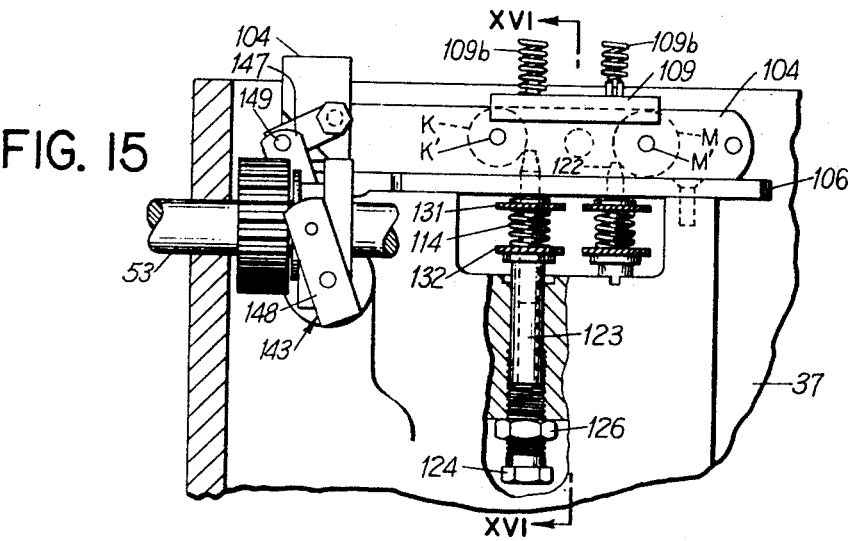
FIG. 15
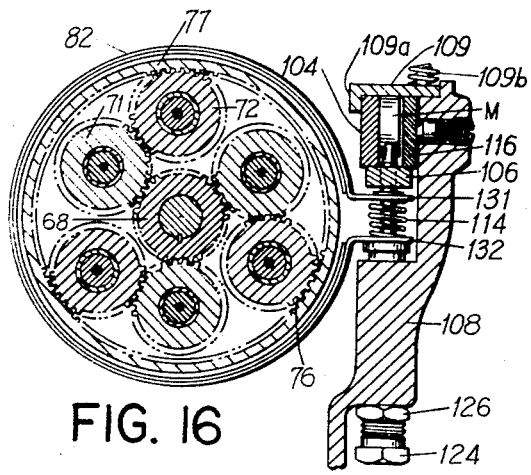
FIG. 16
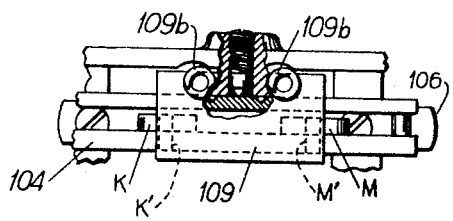
FIG. 17
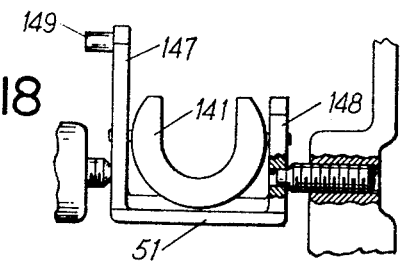
FIG. 18
*INVENTOR.*
MAX HUNGERFORD
BY
ATTORNEY

United States Patent Office 3,447,399
Patented June 3, 1969

3,447,399
TRANSMISSION ASSEMBLY FOR TRACTOR
Max Hungerford, La Grange, Mich., assignor to American Machine & Foundry Co., a corporation of New Jersey
Continuation-in-part of application Ser. No. 601,632, Dec. 14, 1966, now Patent No. 3,329,249. This application Mar. 23, 1967, Ser. No. 625,364
Int. Cl. F16h 57/10
U.S. Cl. 74—769      6 Claims

ABSTRACT OF THE DISCLOSURE

A garden type tractor including a rigid frame embodying a tubular housing between the output shaft of the engine and the axle assembly, the tubular housing accommodating the drive shaft enclosed in a tubular casting fixed at one end to the engine support and to the transmission and rear axle. The transmission includes a planetary unit for transmitting power from the input shaft to the output shaft at any one of three selected speeds and includes in its assembly friction-type brake bands enclosing drums mounted for rotation and associated with ring gears. The friction bands encircle the drums and are actuated to engage the periphery of the drums to selectively prevent the drums from rotating. In the transmission there is included a clutch plate for operative association with an end of one of the drums. A structure is provided for selectively effecting application of the brake bands and the clutch plate, the structure being manually operable and conveniently located for actuation by the operator. Associated with the transmission and the operating mechanism, a take-off shaft is provided to be selectively operated from the same manually actuated mechanism. Included in the drive to the rear axles is a two-speed differential structure multiplying the speed ratios and incorporating manual controls for selective use.

Disclosure of the invention

The present application is a continuation-in-part of my co-pending application Ser. No. 601,632, filed Dec. 14, 1966, now Patent Number 3,329,249.

This invention relates to a tractor and, more particularly, to a relatively small tractor of the type used by home owners and owners of small plots of ground for such purposes as snow plowing, cutting grass, plowing and cultivating small areas of ground, etc.

Because of their size and expense, the large, farm-type tractors conventionally used for commercial farming operations are not well suited for homeowner uses. A wide variety of the small, so-called garden-type tractors have been offered for these purposes and same have achieved substantial commercial acceptance. However, it has been observed that the presently available garden-type tractors are not completely satisfactory. In many cases their power transmission systems employ belts and these are erratic, have high maintenance costs and do not transfer power as efficiently as desired. Further, in many cases the prior art machines are not constructed sufficiently sturdily to meet the severe usage to which they may be put. Moreover, the prior art machines are not sufficiently versatile, as regards the attachments which can be used therewith, the speeds at which they can be driven and/or their maneuverability, to be completely satisfactory for a wide variety of uses.

Accordingly, it is an object of this invention to provide an improved, garden-type tractor which is comprised of relatively inexpensive but sturdy parts, which does not utilize belts, chains or the like for power-transmitting purposes and which has sufficient power and maneuverability to enable it to perform a wide variety of tasks.

It is a further object of this invention to provide an improved, garden-type tractor, as aforesaid, in which a simple, relatively inexpensive, gear-type, power transmission which provides a relatively large number of available speed ratios and which also provides a positive gear drive from the engine to the driving wheels thereof.

It is a further object of this invention to provide an improved, garden-type tractor, as aforesaid, which employs a two speed rear axle and wherein the two rear driving wheels are independently driven and are independently braked to improve the maneuverability of the tractor.

It is a further object of this invention to provide an improved, garden-type tractor, as aforesaid, in which shifting of the transmission and the rear axle is accomplished by manual controls which can be operated easily with a minimum of instruction and in which shifting of the transmission is effected without actuation of a clutch between the engine and the transmission.

It is a further object of this invention to provide an improved, garden-type tractor, as aforesaid, which has a simple, inexpensive, but highly effective, gear-type steering system which enables the operator to steer the tractor with a minimum of effort.

It is a further object of the invention to provide an improved, garden-type tractor in which the main frame of the vehicle is comprised of rigidly connected castings which provide great strength so that the tractor can be subjected to extremely rough usage without detriment.

It is a further object of the invention to provide an improved, garden-type tractor, as aforesaid, which has both a low initial cost and a low maintenance cost.

Other objects and advantages of the invention will be apparent to persons acquainted with equipment of this type upon reading the following descriptions and inspecting the accompanying drawings.

In the drawings:

FIGURE 1 is a side view of the tractor with the ground engaging wheels thereof being shown in broken lines.

FIGURE 2 is a front view of the tractor.

FIGURE 3 is a rear view of the tractor.

FIGURE 15 is a sectional view of a modified form of gear and brake control mechanisms.

FIGURE 16 is a sectional view taken along the line XVI—XVI of FIGURE 15 showing the parts associated with a brake band assembly.

FIGURE 17 is a fragmentary top plan view of the modified shift bar assembly.

FIGURE 18 is a partial sectional view of the yoke linkage.

Figure 4:
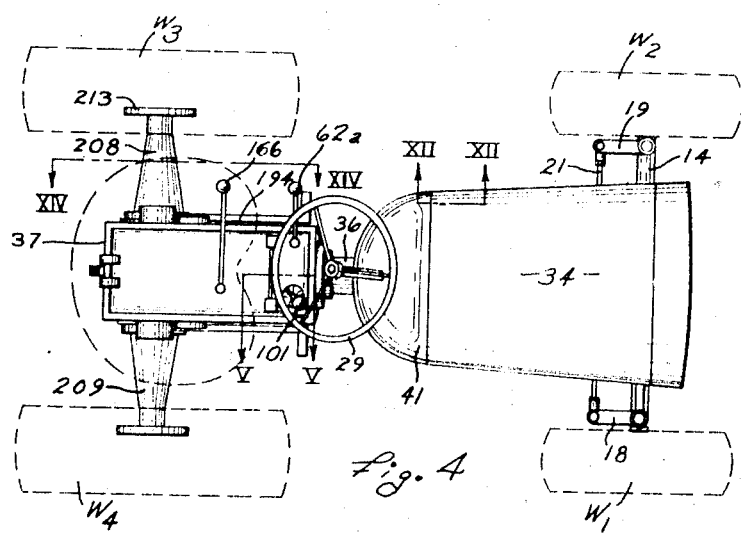
FIGURE 4 is a top view of the tractor with the driver's seat not shown.
Figure 7:
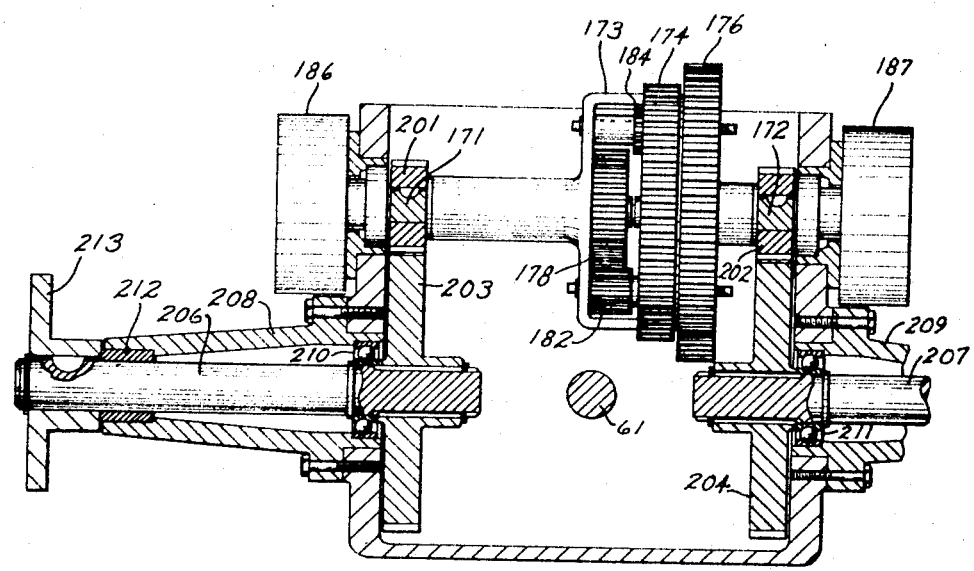
FIGURE 7 is a sectional view taken along the line VII—VII of FIGURE 1, and with the cover of the transmission and axle housing removed.

Referring to the drawings, the tractor 10 is comprised of a substantially L-shaped engine support 11, preferably a cast iron casting, having a substantially horizontal lower wall 12 and an upright wall 13, said walls having stiffening flanges 15 at the juncture thereof. The front axle 14 is pivotally mounted midway between its ends on the front end of wall 12 by a pivot pin and bracket structure 20.

The axle 14 has pivotally mounted axle ends of steering knuckles 16 and 17 which have arms 18 and 19, respectively, projecting therefrom. The arms 18 and 19 are connected by a tie-rod 21. A drag link 22 is connected to a steering arm 25 on the steering knuckle 16. Thus, when link 22 moves lengthwise, the front wheels, which are connected to the steering knuckles 16 and 17 and which are shown in broken lines at $W_1$ and $W_2$, are pivoted with respect to the axle 14. The link 22 is pivotally connected at its other end to a bar 23 which is mounted upon gear 24 and which projects radially therefrom. Gear 24 is meshed with a pinion 26 which is connected through a universal joint 27 and a steering column 28 to the steering wheel 29. Thus, arcuate movement of the steering wheel 29 will effect rotation of gear 24 and thereby lengthwise movement of link 22 to effect simultaneous pivotal movement of steering knuckles 16 and 17.

The hood 31 is comprised of an upright grill 32 which is pivotally mounted at its lower end on the forward end of the wall 12 by suitable pivot connections 33. The hood 31 has a horizontally extending top panel 34 which extends rearwardly from the upper end of the grill 32. An engine, schematically illustrated at E, is mounted, as by bolts, onto the wall 12 of the support 11 and said engine is covered in front and on top by the hood 31.

The output shaft S of the engine is rigidly connected to a drive shaft 35 which extends through an opening in the upright wall 13, thence through a drive shaft housing 36 into the transmission and rear axle housing 37. The drive shaft housing 36 is of strong and sturdy construction, preferably a cast iron casting, and it is flanged at its ends and said flanges are fixedly secured to the engine support 11 and to the transmission and rear axle housing 37 by bolts or the like. It is to be noted that due to the rigid construction of the housing 36, the connection from the drive shaft S to the input of the transmission is a rigid connection and no universal joints are used.

Figure 12:
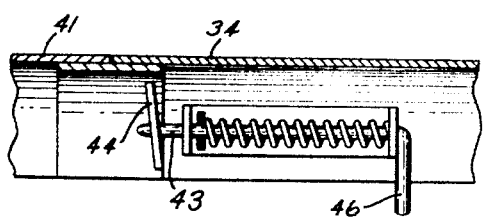
FIGURE 12 is a sectional view taken along the line XII—XII of FIGURE 4.

A dashboard 41 is mounted by a downwardly and forwardly inclined bracket 42 onto the upper end of the wall 13 of engine support 11. The steering column 28 extends through the dashboard, thence downwardly and forwardly just behind the bracket 42. The hood 31 is releasably engageable with the dashboard 41. For this purpose, a spring-urged pin 43 (FIGURE 12) is mounted on the top panel structure 34 adjacent both sides thereof and each pin 43 urged into an opening in a bracket 44 on said dashboard 41. By grasping the handle 46 and retracting the pin 43, the hood 31 may be released from the dashboard 41 so that the hood can be pivoted forwardly to expose the engine E.

The housing 37 contains a three speed transmission 51 and a two speed rear axle 52 connected in series with said transmission. Thus, the power train provides six speeds, four speeds forward and two speeds reverse.

The transmission input shaft 53, which may be integral with or which is at least rigidly secured to the drive shaft 35, carries a power take-off gear 54 which meshes with an idler gear 56 which is rotatably mounted upon a stationary idler shaft 55. The idler gear 56 meshes with a gear 57 rotatably mounted on a rotatable power take-off shaft 61. A clutch sleeve 58 is splined on shaft 61 and is axially slidable thereon. The sleeve 58 has teeth 59 which are engageable with teeth 60 on gear 57 whereby gear 57 can be clutched to shaft 61 to effect rotation of said shaft. A rod 62 is pivotally mounted on the housing 37 and it is connected to effect pivotal movement of a yoke 63. Pivotal movement of rod 62 is effected by a manually operable lever 62a. The yoke 63 has an arcuate member 64 received in a groove 65 in sleeve 58 whereby pivotal movement of yoke 63 effects axial movement of said sleeve along shaft 61. The power take-off shaft 61 projects through both the forward and rearward ends of the housing and it has end portions 61a, 61b located outside of said housing which can be connected to accessory equipment to be operated by the tractor. Thus, by manipulation of the lever 62a, the operator can turn on or turn off the power take-off shaft 61.

Figure 8:
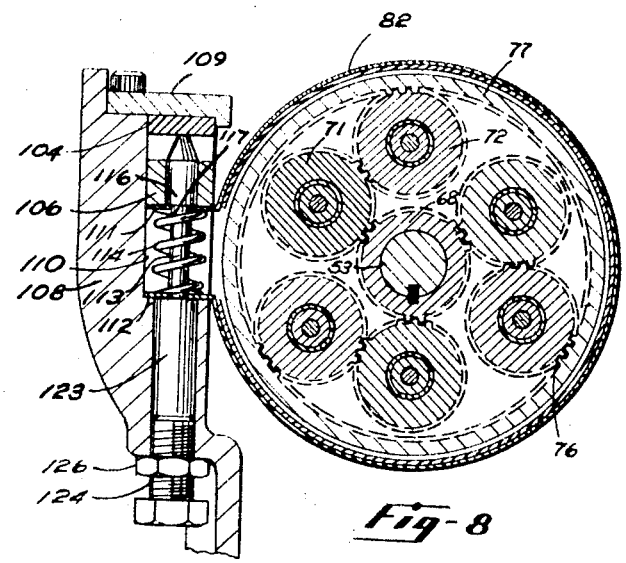
FIGURE 8 is a sectional view taken along the line VIII—VIII of FIGURE 5.
Figure 11:
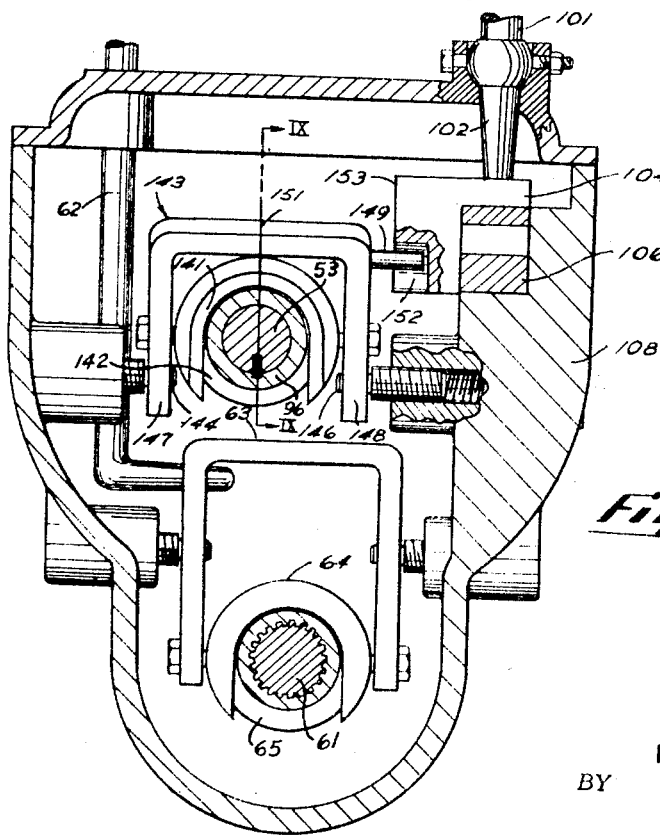
FIGURE 11 is a sectional view taken along the line XI—XI of FIGURE 5.
Figure 13:
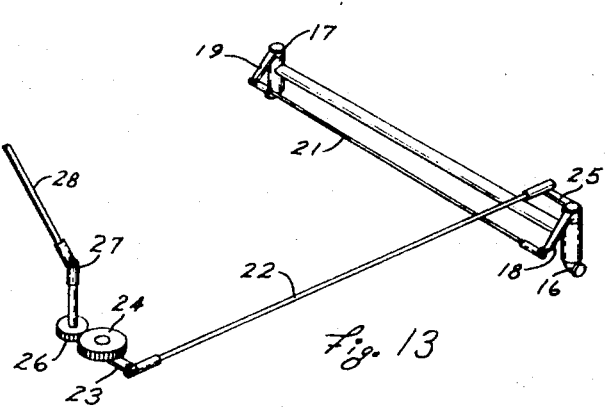
FIGURE 13 is a schematic view of the steering system of the tractor.
Figure 14:
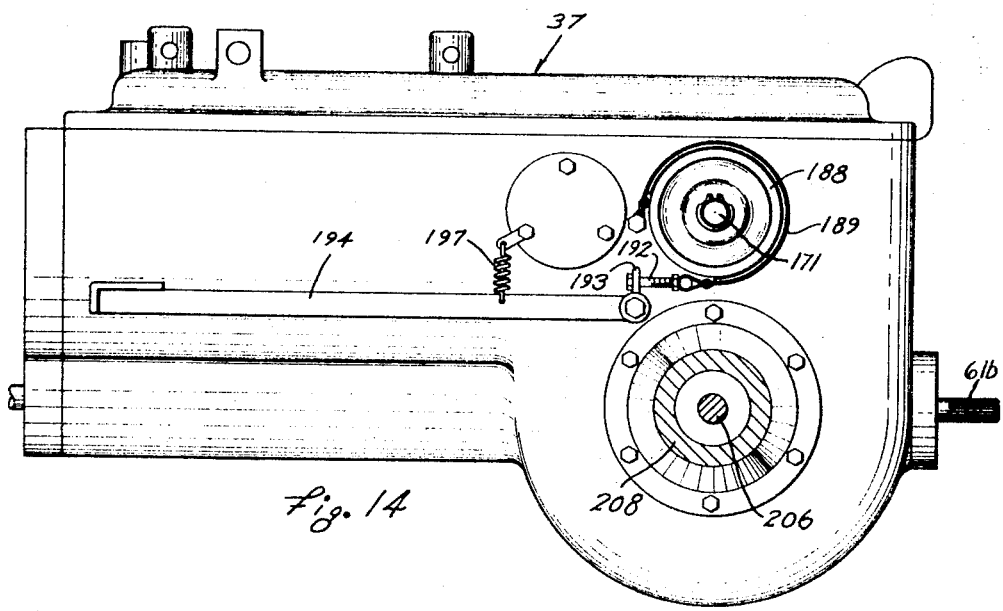
FIGURE 14 is a sectional view taken along the line XIV—XIV of FIGURE 4.

The transmission 51 includes a planetary unit 66 for transmitting power from the input shaft 53 to the output shaft 67 at any one of three selectable speeds. The planetary unit 66 includes a sun gear 68 secured, as by keying, to the input shaft 53 for rotation therewith. A planet gear carrier 69 is integral with the output shaft 67 and said carrier rotatably supports a group, here three, of small planet gears 72. The gears 71 and 72 are arranged alternately around the sun gear 68 and each gear 71 is meshed with a gear 72 (FIGURE 8).

The large gears 71 are in continuous mesh with the sun gear 68 and also continuously mesh with an internal ring gear 73 on a first drum 74 which is mounted for rotation with respect to shaft 53. The small gears 72 are in continuous mesh with an internal ring gear 76 on a second drum 77 which is mounted for rotation with respect to shaft 53 and which is located adjacent the first drum 74. It is to be noted that gears 71 do not mesh with ring gear 76 and gears 72 do not mesh with the sun gear or with ring gear 73.

A friction-type brake band 81 encircles the drum 74 and another friction-type brake band 82 encircles the drum 77. When the band 81 engages the periphery of drum 74 and prevents said drum from rotating, the gears 71 will planetate around the sun gear 68. Thus, the carrier 69 and thereby the output shaft 67 will be rotated at a reduced speed with respect to the speed of the input shaft 53. This is the low forward speed of the transmission. When the band 82 engages the periphery of drum 77 and prevents rotation thereof the carrier 69 and thereby the output shaft will also be rotated about the sun gear 68. Here, however, since the gears 72 are rotated through the gears 71, rather than directly by the sun gear 68, the torque exerted to rotate the carrier 69 will be reversed. Thus, application of the band 82 on drum 77 provides a reverse drive for the shaft 67.

A sleeve 86 surrounds the shaft 53 and is drivably secured thereto, as by keying. An annular friction clutch plate 87 is mounted on the sleeve 86, as by splining, for axial but not rotatable movement with respect thereto. The plate 87 carries a friction facing 88 which is engageable with the end wall 85 of drum 74. When the plate 87 is in its rightward position, as shown, and facing 88 engages the wall 85 of drum 74, both the drum 74 and the sun gear 68 will be rotated at the same speed and in the same direction and the carrier 69 and the shaft 67 will be rotated at a high rate of speed. This is the high forward speed of the transmission.

Figure 5:
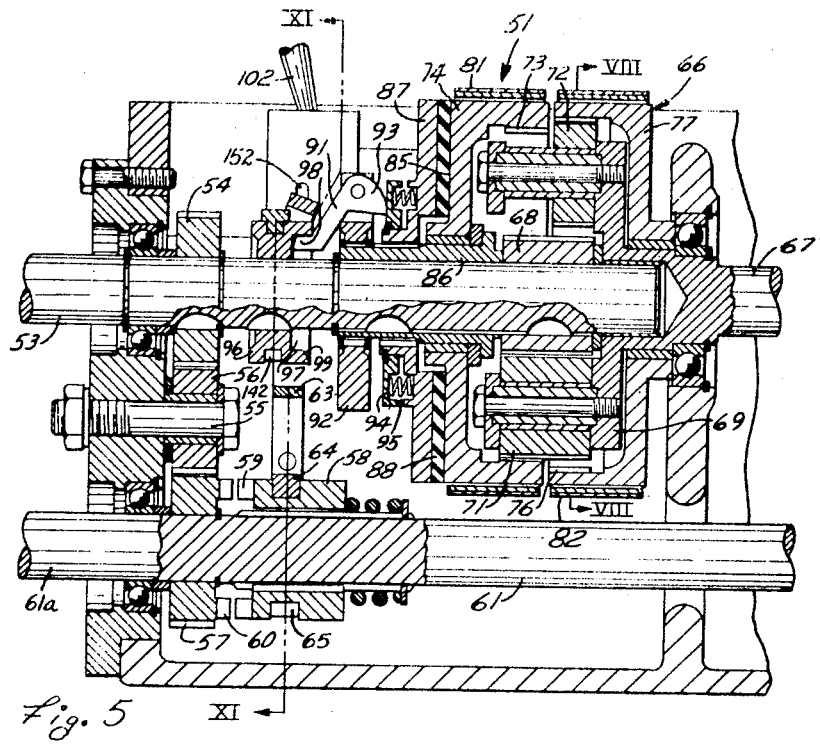
FIGURE 5 is a sectional view taken along the line V—V of FIGURE 4, and with the cover of the transmission and axle housing removed.

The clutch plate 87 is moved into its rightward position by a plurality of levers of which one appears at 91, which are pivotally mounted on a collar 92 which is securely mounted on sleeve 86. The levers 91 each have a cam face 93 engageable with a plate 94 which is mounted for axial sliding movement on and with respect to plate 87. Springs 95 normally urge plate 94 away from plate 87. Thus, when the levers are pivoted counterclockwise as appearing in FIGURE 5, said plate 94 is moved rightwardly against the urging of springs 95 to thereby move the clutch plate 87 to its rightward position.

The levers 91 are pivoted by means of a collar 96 axially slidably mounted on shaft 53. The collar has a recess 97 in its rightward end. The levers 91 each have a projection 98 at their leftward end, which projections are receivable in the recess 97. The recess 97 has a rightwardly flaring cam surface 99 which is engageable with said projections 98 and which effects the afore-mentioned counterclockwise movement of levers 91 when collar 96 is moved rightwardly toward said levers. When the projections 98 are received in the recess 97, the levers 91 are held in position holding the clutch plate 87 against wall 85 of the drum 74.

The structure for selectively effecting alternate application of the brake bands 81 and 82 and the clutch plate 87 comprises a manually operable, ball-and-socket type shift lever 101 which extends upwardly from the housing 37. The shift lever has a downwardly projecting arm 102 which is received in a recess 103 in a slidably mounted shift bar 104. The shift bar 104 is supported for sliding movement with respect to a base plate 106 which in turn is secured to the side wall 108 of the housing 37. The shift bar 104 is retained in place by a retainer plate 109.

As shown in FIGURE 8 with respect to band 82, the band 82 is radially split and has two sidewardly extending flanges 111 and 112 integral with the ends of the band. The flanges 111 and 112 extend into a recess 110 in the side wall 108 below the base plate 106. A pin 113 extends through openings in flanges 111 and 112 and a spring 114 surrounds said pin and urges said flanges apart whereby the band is normally released from its associated drum. The pin 113 has an enlarged head 116 which slidably extends through plate 106 and which has a shoulder 117 for engaging and moving the flange 111 toward the flange 112 to cause the band to engage the drum. To effect movement of the pin 113, the bar 104 has an elongated notch 118 in its lower surface, said notch having cam surfaces 119 and 121 at its ends. The head 116 of pin 113 has a conical upper part 122 whose inclination corresponds to that of surface 121. Thus, upon leftward movement of bar 104, as appearing in FIGURE 9, surface 121 forces the pin downwardly to thereby apply brake 82.

In order to compensate for wear of the friction surface of band 82 and in order to provide correct initial adjustment thereof with respect to the drum, the lower flange 112 rests upon a tube 123 which is slidably disposed in an opening in the side wall 108 of the housing 37. The lower end of the pin 113 slidably extends into the central opening in tube 123. The vertical position of tube 123 is adjustable by a screw 124 which is threaded into the side wall 108 and which may be releasably locked in position therein by a lock nut 126. Thus, by suitably positioning the tube 123, flanges 111 and 112 can be positioned at the correct distance from each other so that the band can be operated with the greatest ease and effectiveness.

The band 81 has flanges 131 and 132 which correspond to the flanges 111 and 112 of band 82. These flanges 131 and 132 are moved toward and away from each other by the pin 133 which corresponds in all respects to pin 113. Therefore, pin 133 needs no further detailing.

The bar 104 has a second notch 134 therein, said notch having cam surfaces 136 and 137 at its ends. Cam surface 119 is effective to depress pin 133 when the bar 104 is moved rightwardly to thereby apply the band 81. When the bar 104 has been moved rightwardly so that pin 133 is received in notch 134, the band 81 is released. If the bar 104 is then moved leftwardly cam surface 136 will then depress pin 133 and apply band 81.

An arcuate ring 141 is received in a groove 142 in collar 96 and said ring is pivotally mounted on a U-shaped yoke 143. The yoke 143 is pivotally mounted on the casing by pins 144 and 146 which extend through openings in the free ends of legs 147 and 148, which openings are located below the shaft 53. A pin 149 is secured to and extends sidewardly from the yoke 143 adjacent the web 151 thereof and said pin extends into a vertically elongated slot 152 in an enlargement 153 at the leftward end of the shift bar 104. Thus, rightward movement of shift bar 104 will move the ring 141 and thereby collar 96 rightwardly on shaft 33 and leftward movement of the shift bar will move the parts in opposite direction.

Figure 9:
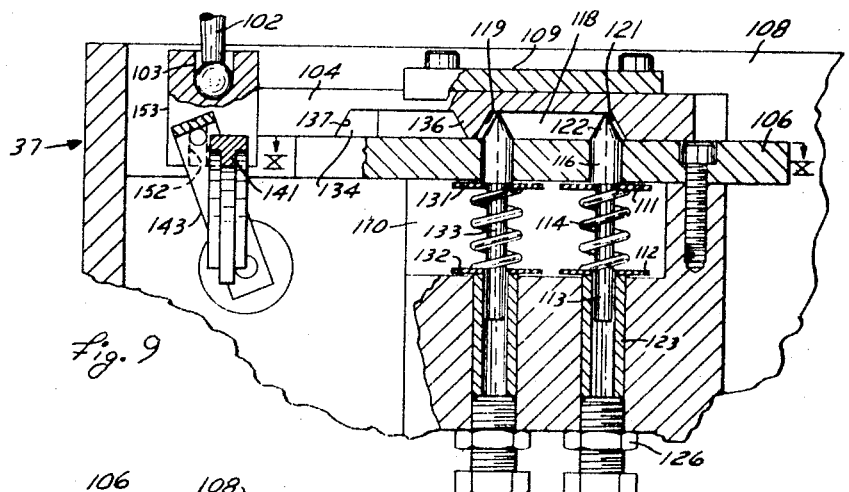
FIGURE 9 is a sectional view taken along the line IX—IX of FIGURE 11.
Figure 10:
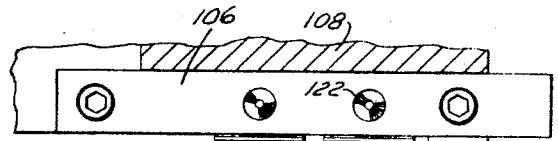
FIGURE 10 is a sectional view taken along the line X—X of FIGURE 9.

Thus, upon leftward movement of bar 104 from the neutral position shown in FIGURE 9, band 82 will be applied and the transmission will be placed in reverse. On rightward movement of bar 104, first the band 81 will be applied to obtain low forward speed and then upon further rightward movement band 81 will be released and the clutch plate 87 will be applied to drum to obtain high forward speed.

Figure 6:
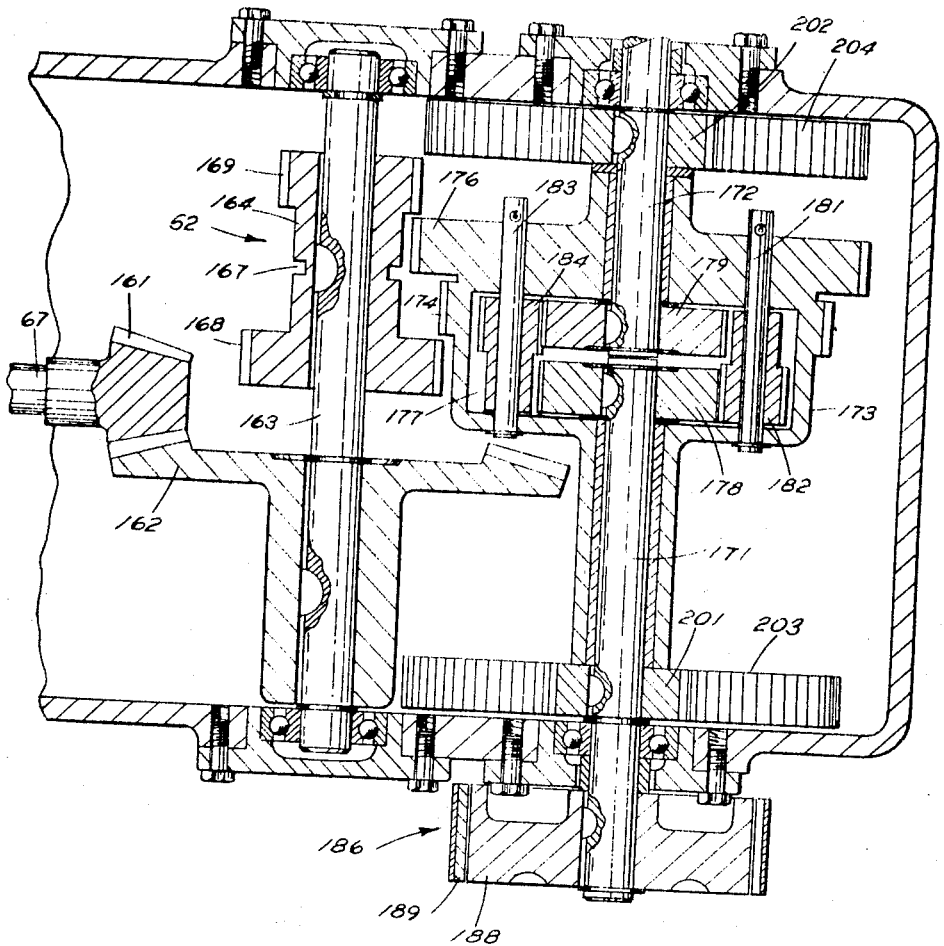
FIGURE 6 is a sectional view taken along the line VI—VI of FIGURE 1.

Referring to FIGURE 6, the output shaft 67 of the transmission has a pinion 161 mounted thereon and said pinion continuously meshes with a bevel gear 162 which is affixed to a rotatable shaft 163. A sleeve 164 is mounted on shaft 163 for axial movement therealong but not for rotation with respect thereto. The sleeve 164 is moved axially by a manually operable lever 166 which actuates a shift yoke (not shown) which is receivable in a groove 167 in said sleeve. The sleeve 164 has a pair of gears 168 and 169 thereon for purposes appearing hereinafter.

Two shafts 171 and 172 are arranged parallel with shaft 163 and in axially aligned, end-butting-end relationship. A differential housing 173 surrounds the adjacent ends of the shafts 171 and 172 and is rotatably supported thereon. The housing 173 has a pair of drive gears 174 and 176 on its periphery which alternately mesh with the gears 168 and 169, respectively, in response to the axial position of the sleeve 164. The differential housing has a central chamber 177 surrounding the abutting ends of shafts 171 and 172. A pair of identical gears 178 and 179 are fixedly mounted on shafts 171 and 172 close to their abutting ends and these gears are received in chamber 177. A pair of circumferentially spaced pins, of which one appears at 181, extend through the chamber 177 and parallel with shafts 171 and 172. The pins 181 each carry a gear 182 which meshes with gear 178. A similar pair of circumferentially spaced pins, of which one appears at 183, carry gears 184 which mesh with gear 179.

Thus, depending on the position of sleeve 164 as controlled by the lever 166, either gears 168 and 174 will be engaged to thereby rotate the housing 173 at one speed or gears 169 and 176 will be engaged to rotate the housing in the second speed. Rotation of the housing 173 will effect independent rotation of the shafts 171 and 172 at the same speed.

The two shafts 171 and 172 are independently braked by brake units 186 and 187 which are identical. Referring to brake unit 186, the shaft 171 extends through the side wall of the housing 37 and it has a drum 188 secured thereto and located outside of said housing. The drum 188 is encircled by the friction band 189 around the major portion of its periphery. One end of the band 189 is anchored to the housing 37. The other end of the band 189 is connected to a bolt 192. The bolt 192 extends through an opening in a bracket 193 which is secured to a manually or pedally operable lever 194. The lever 194 is pivotally mounted on the side wall of the housing 37. The parts are arranged so that depression of the lever 194 moves the pin substantially tangentially away from the drum 188 and applies the band so that rotation of drum 188 and thereby shaft 171 is prevented. The lever 194 is normally held in its upper position by a spring 197 so that the shaft 171 is ordinarily free to rotate.

The shafts 171 and 172 have relatively small gears 201 and 202, respectively, secured thereto adjacent the side walls of the housing. The gears 201 and 202 mesh, respectively, with relatively large gears 203 and 204 which are secured to drive axles 206 and 207. The axles 206 and 207 are enclosed by housings 208 and 209, which housings are secured, as by bolting, to the side walls of the housing 37. The axles 206 and 207 are rotatably supported at one end thereof by bearings 210 and 211 in the side walls of housing 37. The outer ends of axles 206 and 207 are supported by bushings at the outer end of housing 208 and 209, one of said bushings appearing at 212. Wheel connecting structures, one of which is shown in 213, are secured to the outer ends of the axles 206 and 207 and are secured to the drive wheels $W_3$ and $W_4$ of the tractor.

A driver's seat S is mounted on an arm 216 which is pivotally mounted upon the upper wall of housing 37 adjacent the forward end thereof. A cushioning device 218 is secured to the seat and extends downwardly therefrom for engagement with the upper wall of the housing. A pair of foot rests, of which one appears at 219, are secured to the support 11 on either side of the drive shaft housing 36 at a convenient distance from the driver's seat to enable the driver to rest his feet thereon.

Thus, the tractor 10 is comprised of strong and durable parts and power is transmitted from the engine by a gear type drive to the driving wheels $W_3$ and $W_4$. The three speed transmission may be shifted by manipulation of the lever 101 to effect movement of shift bar 104 in the manner previously described to provide the various speed ratios. Lever 62a can be manually operated to provide operation of the power take-off when desired. Lever 166 can be manually operated to provide low-speed, neutral or high-speed setting of the rear axle. By depression of lever 194 or the corresponding lever on the other side of housing 37, transmission of power to wheels $W_3$ and $W_4$ can be individually stopped as desired to assist in maneuvering the tractor. The tractor is steered by the operator in the usual manner.

The parts disclosed in FIGURES 15, 16, 17 and 18 basically correspond to the structural elements in such figures as 8, 9 and 10 and have corresponding reference characters applied thereto. It will be noted in FIGURES 15–18 that the shift bar 104 is supported for sliding movement with respect to a base plate 106, which in turn is secured to a side wall 108 of the housing 37. The shift bar 104 is retained in place by the retainer plate 109 which is provided with a flange 109a to prevent lateral displacement and is held firmly seated by spaced coil springs 109b to provide the necessary play for movement of the various parts. The shift bar 104 is provided with a pair of spaced rollers $k$ and $m$ mounted on bearings $k'$ and $m'$. The rollers $k$ and $m$ are appropriately spaced and positioned to engage the terminals of the pins 113 and 133 to force the same downwardly to cause the band flanges 131 and 132 to be compressed against their interposed springs 114 to cause either band, according to the operation of the shift bar 104, to be compressed to brake its associated drum. The outer terminal roller $m$ is mounted below the roller $k$ as will be seen from an inspection of FIGURE 15. The shift bar 104 will be controlled by the same type of operating lever as shown in FIGURES 5 through 9 and will include the same yokes and other equipment essential to the operation of the assembly.

What is claimed is:

1. A transmission assembly for a drive shaft which comprises a housing, planetary assemblies, ring gears for the planetary assemblies, drums mounting the ring gears, brake bands for the drums having parallel spaced outwardly extending flange portions, spring means spacing said brake bands flanged portions, pin means extending through the flanges and through the spring means, a base plate fixed to the housing, openings in said base plate for the passage of the end portions of said pins, a shift bar traveling on said base plate, spaced rollers fixed to said shift bar and aligned for selectively engaging said pin extremities for compressing said band flanges, a retainer plate for securing said shift bar against lateral displacement, and spring means for seating said retainer plate in position on said bar.

2. The structure of claim 1 characterized in that the spaced rollers are mounted on bearings for modifying the pressure each said roller applies to the associated pin extremity.

3. The structure of claim 1 characterized in that the means for securing the shift bar against lateral displacement includes a depending flange provided at one edge of the retainer plate directly engaging the shift bar with the other edge of the retainer plate abutting a projection on the frame.

4. The structure of claim 3 characterized in that the spring means for seating said retainer plate is applied to the retainer plate adjacent its abutment with the flange.

5. The structure of claim 1 characterized in that manual means are provided for actuating the shift bar and said manual means includes a clutch plate associated with a planetary assembly and a linkage connected thereto for applying pressure to the clutch plate.

6. The structure of claim 5 characterized in that a power take-off is provided with a clutch for driven engagement with the transmission within the drive shaft housing and manual means are provided for the actuation of said clutch for the power take-off.

References Cited

UNITED STATES PATENTS

| | | | |
|---|---|---|---|
| 3,266,590 | 8/1966 | Hungerford | 180—75 X |
| 3,307,431 | 3/1967 | Hungerford | 74—769 |

A. HARRY LEVY, *Primary Examiner.*

U.S. Cl. X.R.

74—15.84, 701, 740; 180—6.2, 53, 70; 188—77; 280—106